(12) United States Patent
Lun

(10) Patent No.: US 8,813,923 B2
(45) Date of Patent: Aug. 26, 2014

(54) HYDRAULIC DAMPER ASSEMBLY

(75) Inventor: Saiman Lun, Centerville, OH (US)

(73) Assignee: BeijingWest Industries, Co. Ltd., Beijing (CN)

( * ) Notice: Subject to any disclaimer, the term of this patent is extended or adjusted under 35 U.S.C. 154(b) by 116 days.

(21) Appl. No.: 13/519,810

(22) PCT Filed: Mar. 30, 2011

(86) PCT No.: PCT/CN2011/000548
§ 371 (c)(1),
(2), (4) Date: Aug. 16, 2012

(87) PCT Pub. No.: WO2012/071764
PCT Pub. Date: Jun. 7, 2012

(65) Prior Publication Data
US 2012/0312650 A1    Dec. 13, 2012

Related U.S. Application Data

(60) Provisional application No. 61/417,495, filed on Nov. 29, 2010.

(51) Int. Cl.
F16F 9/00    (2006.01)
(52) U.S. Cl.
USPC ............... 188/315; 188/322.14; 188/285
(58) Field of Classification Search
USPC .......... 188/315, 322.14, 285, 282.4, 319.1, 188/319.2, 299.1
See application file for complete search history.

(56) References Cited

U.S. PATENT DOCUMENTS

| 5,150,775 A | * | 9/1992 | Charles et al. | ............. 188/266.3 |
| 5,992,585 A | * | 11/1999 | Kazmirski et al. | ....... 188/322.14 |
| 6,651,788 B1 | | 11/2003 | Wohlfarth | |

FOREIGN PATENT DOCUMENTS

| CN | 2283149 Y | 6/1998 |
| GB | 1002946 A | 9/1965 |
| JP | 8226484 A | 9/1996 |
| JP | 9112620 A | 5/1997 |

OTHER PUBLICATIONS

International Search Report PCT/CN2011/000548 mailed on Sep. 8, 2011.

* cited by examiner

*Primary Examiner* — Robert Siconolfi
(74) *Attorney, Agent, or Firm* — Dickinson Wright PLLC

(57) ABSTRACT

Disclosed is a hydraulic damper including a valve housing (78) having a valve housing bore (88) disposed in abutting relationship with a bypass insert (68) of a base valve assembly (56) for isolating a bypass passage (70) from a reservoir (36). The valve housing (78) defines a valve housing orifice (128) extending therethrough to define an orifice plane (P). A valve (106) is rotatably disposed within the valve housing bore (88) and defines at least one valve orifice (130) extending therethrough along the plane (P). The valve (106) is rotatable between a closed position and an open position to align the valve orifice (130) and the valve housing orifice (128). A working fluid flows serially through the bypass passage (70), the valve orifice (130), and the open valve housing orifice (128). A modulating valve (134) overlays the valve housing orifice (128) for variably and incrementally increasing the fluid flow through the aligned orifices (128, 130) in response to an increase in pressure in the valve housing orifice (128) above a predetermined pressure.

13 Claims, 3 Drawing Sheets

HYDRAULIC DAMPER ASSEMBLY

CROSS REFERENCE TO RELATED APPLICATION

This application is a National Stage of International Application No. PCT/CN2011/000548 filed 30 Mar. 2011, which claims priority to provisional application No. 61/417,495 filed Nov. 29, 2010. The entire disclosure of the above applications are incorporated herein by reference.

BACKGROUND OF THE INVENTION

1. Field of the Invention

The subject invention pertains to a hydraulic damper assembly including a base valve assembly.

2. Description of the Prior Art

The hydraulic damper assemblies to which the subject invention pertains are assemblies which damper opposing forces by a flow of a working fluid between a compression chamber and a reservoir chamber. One such hydraulic damper assembly is disclosed in U.S. Pat. No. 6,651,788 granted to Wohlfarth wherein a hydraulic damper assembly includes an inner-tube extending about an axis and having a compression chamber for receiving a working fluid. An outer-tube extends about the axis and is disposed in surrounding relationship with the inner-tube to define a reservoir chamber between the tubes. A base valve assembly is disposed between the tubes and has at least one base orifice extending through the base valve assembly for establishing fluid communication between the chambers. A bypass insert extends through the base valve assembly and defines a bypass passage for establishing secondary fluid communication between the chambers. A valve housing is disposed in abutting relationship with the bypass insert and has a valve housing bore for isolating the bypass passage from the reservoir chamber, and the valve housing defines a valve housing orifice extending therethrough to define an orifice plane P extending parallel with the valve housing orifice.

Although the prior art hydraulic damper assemblies are able to establish a secondary fluid, communication through the bypass passage and the valve housing orifice, there remains a need for a design which selectively establishes the secondary fluid communication independent of a pressure in the compression chamber.

SUMMARY OF THE INVENTION AND ADVANTAGES

The invention provides for a valve rotatably disposed within the valve housing bore and defining at least one valve orifice extending therethrough along the plane and being rotatable about the axis between a closed position and an open position to align the valve orifice and the valve housing in the open position whereby fluid flows serially through the bypass pasage and the valve orifice and the valve housing orifice and is prevented from doing so in the closed position in response to the valve covering the valve housing orifice.

One advantage of the invention is that the valve functions as an on/off mechanism that controls flow through the aligned orifices independent of a pressure in the compression chamber. Accordingly, the valve more selectively establishes fluid flow through the bypass passage and the valve housing orifice. In addition, the rotatable valve can be controlled by a user, and therefore allows for additional fluid flow through the base valve assembly based on a preference or selection by the user. For example, the hydraulic damper assembly could provide sporty handling when a sport mode of a vehicle is desired, while alternatively providing smooth and quiet handling when a comfort mode of the vehicle is desired. Also, the valve design can be adapted to a current hydraulic damper assembly with minimal effect on the manufacturing processes, resulting in a low cost option to improve damping.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 4 is a cross-sectional view taken along line 4-4 of FIG. 3.

DETAILED DESCRIPTION OF THE ENABLING EMBODIMENT

Figure 1:
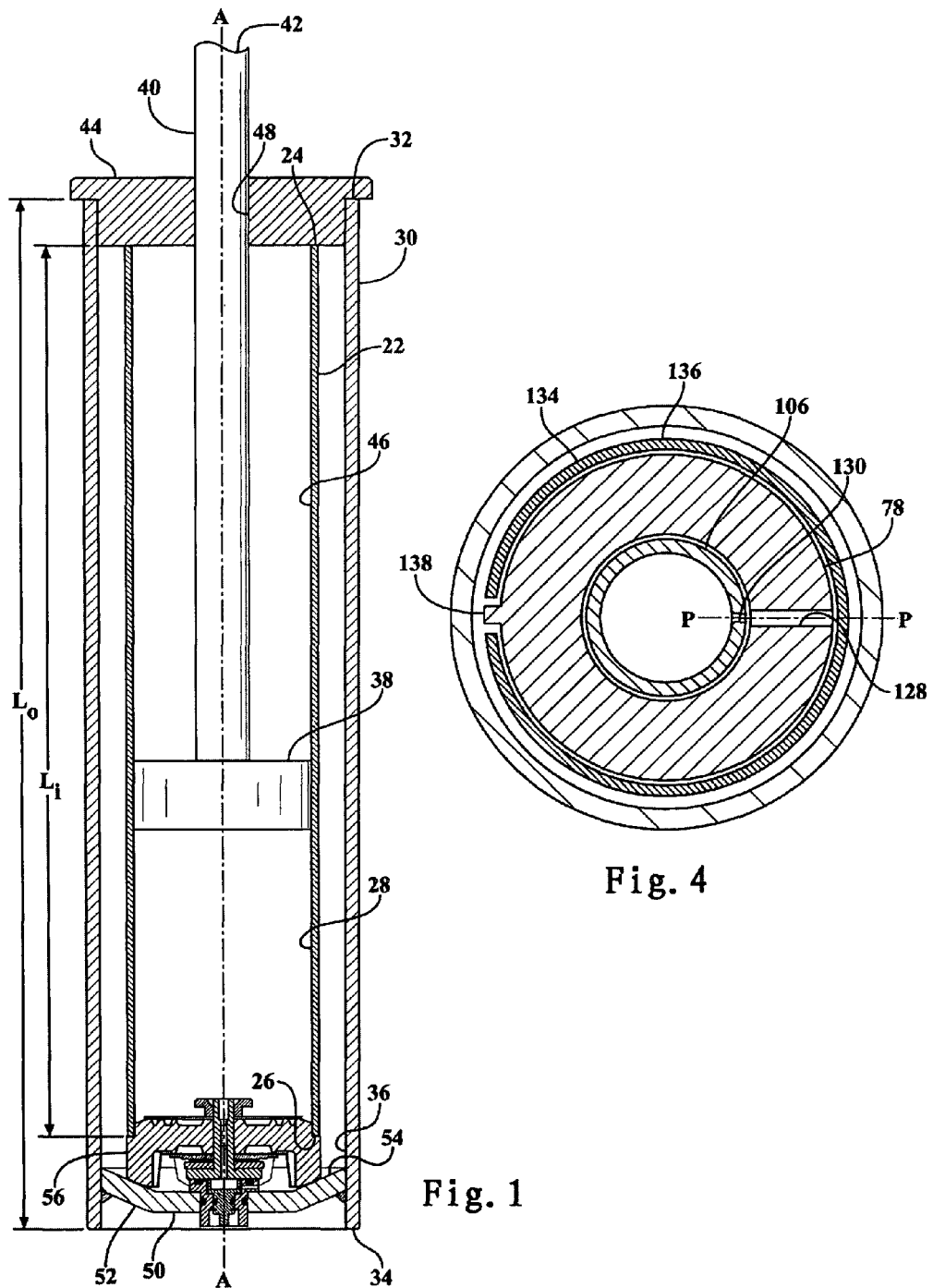
FIG. 1 is an cross-sectional view of a hydraulic damper assembly showing a base valve assembly disposed between an inner-tube and an outer-tube.

Referring to the Figures, wherein like numerals indicate corresponding parts throughout the several views, a hydraulic damper assembly is generally shown in FIG. 1. The hydraulic damper assembly includes an inner-tube 22 extending along an inner-tube length $L_i$ and about an axis A between an inner-top end 24 and an inner-bottom end 26. The inner-tube 22 has a compression chamber 28 for receiving a working fluid. An outer-tube 30 is disposed in surrounding relationship with the inner-tube 22 and extends along an outer-tube length $L_o$ being greater than the inner-tube length $L_i$. The outer-tube 30 is disposed about the axis A in parallel and spaced relationship with the inner-tube 22 from an outer-top end 32 to an outer-bottom end 34 to define a reservoir chamber 36 between the tubes 22, 30.

A valve piston 38 is disposed in sealing and sliding engagement within the inner-tube 22 along the axis A between a rebound position wherein the piston 38 is disposed next adjacent the top end of the inner-tube 22 and a compression position wherein the piston 38 is disposed next adjacent the bottom end 26 of the inner-tube 22. A rod 40 extends upwardly from the valve piston 38 along the axis A to a rod end 42 disposed outwardly from the top end 32 of the outer-tube 30. An upper cap 44 is disposed in sealing engagement with the top ends 24, 32 of the tubes 22, 30 to define a rebound chamber 46 in the inner-tube 22 being closed between the upper cap 44 and the valve piston 38. The upper cap 44 has a rod opening 48 being sized complementary to and in sealing engagement with the rod 40 for receiving and guiding the rod end 42. The outer-tube 30 includes a bottom cap 50 having a bottom surface 52 closing the bottom end 34 of the outer-tube 30 and a top surface 54 in spaced relationship with the bottom end 26 of the inner-tube 22.

Figure 2:
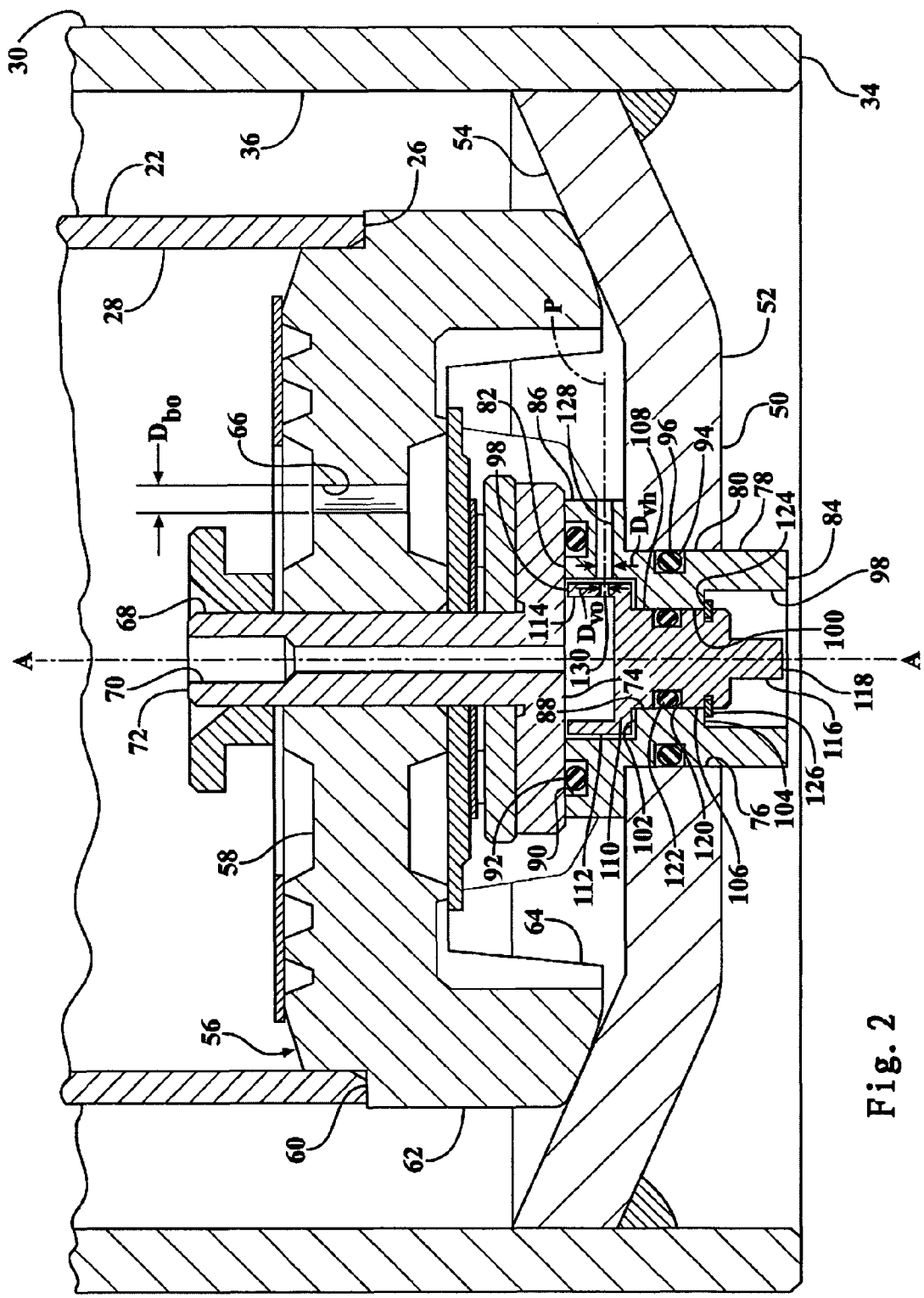
FIG. 2 is a fragmentary and cross-sectional view of the preferred configuration of the base valve assembly showing a valve disposed in an open position to align a valve orifice with a valve housing orifice of a valve housing.
Figure 3:
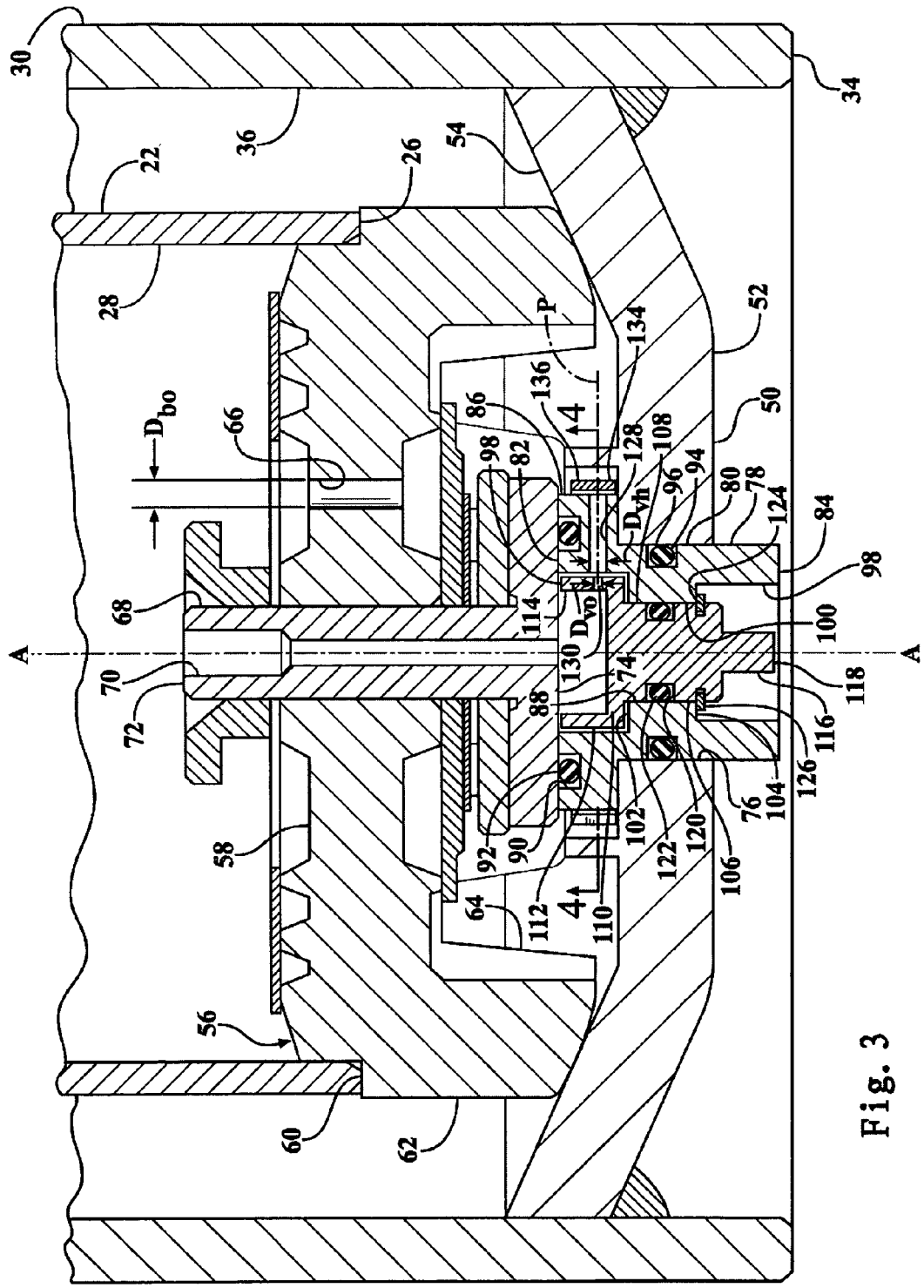
FIG. 3 is a fragmentary and cross sectional view similar to FIG. 2 but showing an additional modulating valve overlaying the valve housing orifice.

A base valve assembly 56 is disposed on the axis A between the bottom end 26 of the inner-tube 22 and the top surface 54 of the bottom cap 50 to further define the compression chamber 28 in the inner-tube 22 being closed between the base valve assembly 56 and the valve piston 38. As best shown in FIGS. 2 and 3, the base valve assembly 56 includes a base 58 having an annular shoulder 60 for receiving the bottom end 26 of the inner-tube 22 and a plurality of legs 62 extending axially from the base 58 in parallel and annularly spaced relationship with the outer-tube 30 for engaging the top surface 54 of the bottom cap 50. Accordingly, the reservoir chamber 36 further includes the space disposed inwardly from the legs 62 between the base 58 and the bottom cap 50 along with radial passages 64 disposed between the adjacent legs 62.

The base 58 defines at least one base orifice 66 extending axially through the base 58 for establishing fluid communication between the compression chamber 28 and the reservoir chamber 36. The base orifice 66 has a base orifice diameter $D_{bo}$ for establishing a first restricted fluid flow from the compression chamber 28 to the reservoir chamber 36 in response to axial movement of the valve piston 38 between the rebound and compression positions. The base valve assembly 56 includes a bypass insert 68 extending through the base 58 and which defines a bypass passage 70 disposed along the axis A between an entrance end 72 open to the compression chamber 28 and an exit end 74 open to the reservoir chamber 36 for establishing secondary fluid communication between the compression and reservoir chambers 28, 36.

The bottom cap 50 defines a bottom bore 76 extending along the axis A between the surfaces 52, 54, and a valve housing 78 having a body portion 80 being cylindrical extends axially within the bottom bore 76. The valve housing 78 extends between a first housing end 82 disposed in abutting relationship with the bypass insert 68 for isolating the exit end 74 of the bypass passage 70 from the reservoir chamber 36 and a second housing end 84 disposed outwardly from the bottom end of the bottom cap 50. The valve housing 78 has a flange portion 86 disposed about the first housing end 82 and which extends radially outwardly from the body portion 80 between the top surface 54 of the bottom cap 50 and the bypass insert 68. The valve housing 78 also presents a valve housing bore 88 extending between the housing ends 82, 84.

The valve housing 78 includes a first groove 90 extending annularly about the axis A in the flange portion 86, and a first seal 92 is disposed in the first groove 90 for establishing sealed relationship between the bypass insert 68 and the valve housing 78. The valve housing 78 also includes a second groove 94 extending annularly about the axis A in the body portion 80, and a second seal 96 is disposed in the second groove 94 for establishing sealed relationship between the bottom bore 76 and the valve housing 78. The preferred embodiment of the first and second seals 92, 96 are o-rings, however any comparable seal could be used.

The valve housing bore 88 is counterbored 98 from each of the housing ends 82, 84 to define an annular projection 100 presenting a first mechanical shoulder 102 and a second mechanical shoulder 104 extending radially outwardly from the valve housing bore 88. A valve 106 having a central portion 108 being cylindrical is rotatably disposed within the valve housing bore 88 and includes a lip portion 110 extending radially from the central portion 108 in abutting relationship with the first mechanical shoulder 102 for supporting the valve 106 within the valve housing bore 88. The valve 106 also has a collar portion 112 extending axially from the lip portion 110 along the counterbore 98 adjacent the first housing end 82 to define an entrance cavity 114 being closed about the exit end 74 of the bypass passage 70 for receiving the working fluid from the bypass passage 70 in response to axial movement of the valve piston 38 between the rebound and compression positions. The valve 106 includes a valve shaft 116 extending downwardly from the central portion 108 along the axis A to a shaft end 118 disposed next adjacent the second housing end 84 of the valve housing 78. The valve 106 includes a third groove 120 extending annularly about the axis A in the central portion 108, and a third seal 122 is disposed in the third groove 120 for establishing sealed relationship between the valve 106 and the valve housing bore 88. Similar to the first and second seals 92, 96, the third seal 122 is preferably an o-ring, however any comparable seal could be used. The valve 106 defines a notch 124 extending annularly about the axis A in the central portion 108 next adjacent the second mechanical shoulder 104, and a clip 126 is disposed in the notch 124 and extends axially in abutting relationship with the second mechanical shoulder 104 for preventing axial movement of the valve 106 within the valve housing bore 88.

The flange portion 86 of the valve housing 78 defines a valve housing orifice 128 extending radially therethrough to define an orifice plane P extending parallel with the valve housing orifice 128 and intersecting the axis A. Correspondingly, the collar portion 112 of the valve 106 defines at least one valve orifice 130 extending radially therethrough along the plane P. A drive mechanism such as an electrical motor, pneumatic actuator, mechanical linkage or the like is coupled to the valve shaft 116 for rotating the valve 106 about the axis A between a closed position and an open position. In the open position, the valve orifice 130 and the valve housing orifice 128 are aligned whereby the working fluid flows serially through the bypass passage 70 and the entrance cavity 114 and the valve orifice 130 and the valve housing orifice 128. Accordingly, when the valve 106 is disposed in the open position, the valve 106 provides for an additional fluid flow path when the valve piston 38 moves from the rebound to compression position. However, in the closed position, fluid is prevented from flowing through the valve orifice 130 and valve housing orifice 128 in response to the collar portion 112 covering the valve housing orifice 128. Therefore, the valve 106 functions as an on/off mechanism and selectively allows the additional flow path through the valve housing orifice 128.

The valve housing orifice 128 has a valve housing orifice diameter $D_{vh}$ for establishing a second restricted fluid flow from the compression chamber 28 to the reservoir chamber 36 which supplements the first restricted fluid flow when the valve 106 is disposed in the open position and the valve piston 38 moves between the rebound and compression positions. In addition, the valve orifice 130 has a valve orifice diameter $D_{vo}$ being smaller than the valve housing orifice diameter $D_{vh}$ for calibrating the second restricted fluid flow.

A modulating valve 134 is disposed in said reservoir chamber 36 and overlays the valve housing orifice 128 for variably and incrementally increasing the second restricted fluid flow through the aligned orifices 128, 130 in response to an increase in the pressure in the entrance cavity 114 above a predetermined pressure. The modulating valve 134 provides for a tuning feature which allows fluid pressure in the valve housing orifice 128 to increase to a desirable point, followed by the opening of the modulating valve 134 to allow for fluid flow out of the valve housing orifice 128. This feature provides a level of control under low damper velocity like in cornering and braking, but under high damper velocity, the modulating valve 134 opens and allows fluid flow for improved comfort.

The modulating valve 134 could be a traditional blow-off spring, or the like. However, as best shown in FIG. 4, the preferred embodiment of the modulating valve 134 is a collar spring 136 disposed annularly about the flange portion 86 for expanding circumferentially in response to the increase in the pressure in the valve housing orifice 128 above the predetermined pressure. The valve housing 78 includes a locking tab 138 extending radially outwardly from the flange, and the collar spring 136 is interconnected to the locking tab 138 for preventing the collar spring 136 from rotating about the valve housing 78.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims. In addition, the reference numerals in the claims are merely for convenience and are not to be read in any way as limiting.

What is claimed is:

1. A hydraulic damper assembly comprising:
   an inner-tube extending about an axis and having a compression chamber for receiving a working fluid,
   an outer-tube extending about said axis and disposed in surrounding relationship with said inner-tube to define a reservoir chamber between said tubes,
   a base valve assembly disposed between said tubes and having at least one base orifice extending through said base valve assembly for establishing fluid communication between said chambers,
   a bypass insert extending through said base valve assembly and defining a bypass passage for establishing secondary fluid communication between said chambers,
   a valve housing disposed in abutting relationship with said bypass insert and having a valve housing bore for isolating said bypass passage from said reservoir chamber,
   said valve housing defining a valve housing orifice extending therethrough to define an orifice plane extending parallel with said valve housing orifice,
   a valve rotatably disposed within said valve housing bore and defining at least one valve orifice extending therethrough along said plane and being rotatable about said axis between a closed position and an open position to align said valve orifice and said valve housing orifice in said open position whereby fluid flows serially through said bypass passage and said valve orifice and said valve housing orifice and is prevented from doing so in said closed position in response to said valve covering said valve housing orifice; and
   a modulating valve overlaying said valve housing orifice for variably and incrementally increasing the fluid flow through said aligned orifices in response to an increase in pressure in said valve housing orifice above a predetermined pressure.

2. An assembly as shown in claim 1 wherein said valve housing orifice has a valve housing orifice diameter for establishing a restricted fluid flow through said valve housing orifice in response to said valve being disposed in said open position, and said valve orifice has a valve orifice diameter being smaller than said valve housing orifice diameter for calibrating said restricted fluid flow.

3. An assembly as shown in claim 1 wherein said modulating valve comprises a collar spring disposed annularly about said valve housing for expanding circumferentially in response to said increase in pressure in said valve housing orifice above said predetermined pressure.

4. An assembly as shown in claim 3 wherein said valve housing includes a locking tab extending radially outwardly, and said collar spring being interconnected to said locking tab for preventing rotation of said collar spring about said valve housing.

5. An assembly as shown in claim 1 further comprising;
   said outer-tube including a bottom cap defining a bottom bore extending along said axis,
   said valve housing having a body portion being cylindrical and extending axially within said bottom bore between a first housing end disposed in abutting relationship with said bypass insert and a second housing end disposed outwardly from said bottom cap,
   said valve housing having a flange portion disposed about said first housing end and extending radially outwardly from said body portion between said bottom cap and said bypass insert for supporting said valve housing within said bottom bore.

6. An assembly as shown in claim 5 further comprising;
   said valve housing bore extending between said housing ends,
   said valve housing being counterbored about said first housing end to define an annular projection presenting a first mechanical shoulder extending radially outwardly from said valve housing bore,
   said valve having a central portion being cylindrical and rotatably disposed within said valve housing bore, and
   said valve having a lip portion extending radially from said central portion in abutting relationship with said first mechanical shoulder for supporting said valve within said valve housing bore.

7. An assembly as set forth in claim 6 wherein said valve has a collar portion extending axially from said lip portion along said counterbore next adjacent said first housing end to present an entrance cavity being closed about said bypass passage for receiving the working fluid from said bypass passage.

8. An assembly as set forth in claim 7 wherein said flange portion of said valve housing defines said valve housing orifice extending radially therethrough and said collar portion of said valve defines said valve orifice extending radially therethrough and said orifice plane intersects said axis.

9. An assembly as set forth in claim 5 further comprising;
   said valve housing bore being counterbored about said second housing end to further define an annular projection and present a second mechanical shoulder extending radially outwardly from said valve housing bore,
   said valve defining a notch extending annularly about said axis in said central portion next adjacent said second mechanical shoulder, and
   a clip disposed in said notch and extending radially in abutting relationship with said second mechanical shoulder for preventing axial movement of said valve within said valve housing bore.

10. An assembly as set forth in claim 6 wherein said valve includes a valve shaft extending downwardly from said central portion along said axis to a shaft end and a drive mechanism coupled to said valve shaft for rotating said valve between said closed and open positions.

11. An assembly as set forth in claim 5 wherein said valve housing includes a first groove extending annularly about said axis in said flange and a first seal disposed in said first groove for establishing sealed relationship between said bypass insert and said valve housing.

12. An assembly as set forth in claim 5 wherein said valve housing includes a second groove extending annularly about said axis in said body portion and a second seal disposed in said second groove for establishing sealed relationship between said bottom bore and said valve housing.

13. An assembly as set forth in claim 6 wherein said valve including a third groove extending annularly about said axis in said central portion and a third seal disposed in said third groove for establishing sealed relationship between said valve and said valve housing bore.

* * * * *

UNITED STATES PATENT AND TRADEMARK OFFICE
CERTIFICATE OF CORRECTION

| | | |
|---|---|---|
| PATENT NO. | : 8,813,923 B2 | Page 1 of 1 |
| APPLICATION NO. | : 13/519810 | |
| DATED | : August 26, 2014 | |
| INVENTOR(S) | : Saiman Lun | |

It is certified that error appears in the above-identified patent and that said Letters Patent is hereby corrected as shown below:

In the Specification

Column 1, Line 56 "pasage" should be --passage--.

In the Claims

Claim 9, Column 6, Line 43 "an" should be --said--.

Signed and Sealed this
Tenth Day of March, 2015

Michelle K. Lee
*Deputy Director of the United States Patent and Trademark Office*